FIG. I.

INVENTOR
WILHELM HEGLER

INVENTOR
WILHELM HEGLER

Nov. 3, 1970 W. HEGLER 3,538,209
METHOD OF PRODUCING PLASTIC TUBING HAVING
A CORRUGATED OUTER WALL
Filed Oct. 19, 1967 3 Sheets-Sheet 3
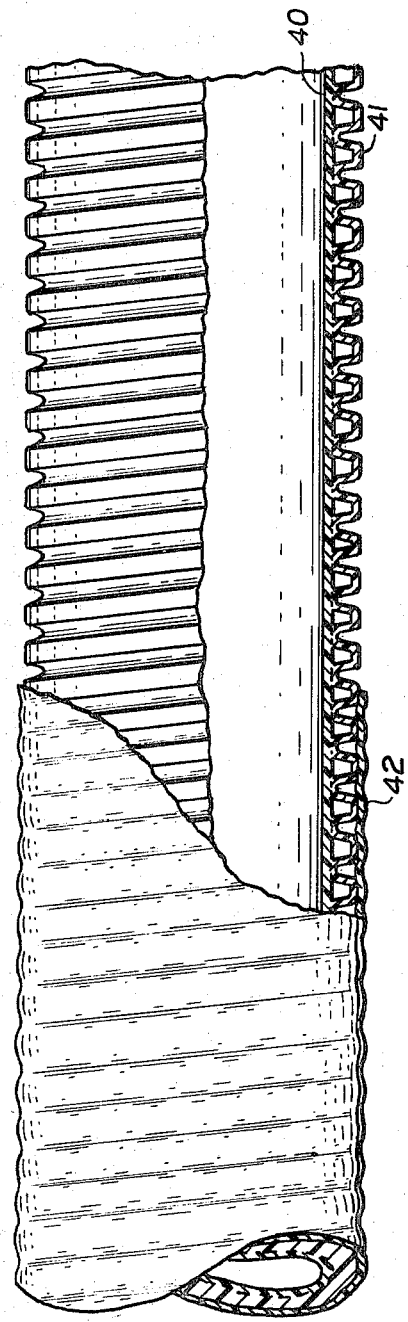
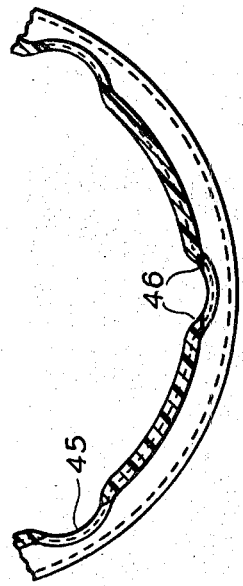
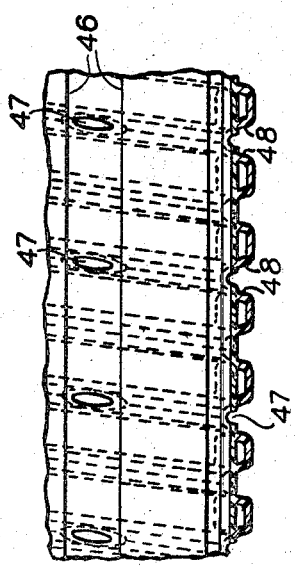
INVENTOR
WILHELM HEGLER
BY
*Burgess, Dinklage & Sprung*
ATTORNEYS.

United States Patent Office 3,538,209
Patented Nov. 3, 1970

3,538,209
METHOD OF PRODUCING PLASTIC TUBING
HAVING A CORRUGATED OUTER WALL
Wilhelm Hegler, Goethestrasse 2,
Bad Kissingen, Germany
Filed Oct. 19, 1967, Ser. No. 676,430
Claims priority, application Austria, Feb. 27, 1967,
A 1,880/67
Int. Cl. B29c 17/07, 17/10; B29d 23/03
U.S. Cl. 264—90                                     8 Claims

ABSTRACT OF THE DISCLOSURE

A method for producing a corrugated, double-walled plastic pipe or tube by extrusion and vacuum forming processes. Two separate tubular streams are simultaneously extruded from separate extruders and are concentrically disposed. The innermost tubular stream is maintained in a substantially smooth wall condition while the outermost tubular stream is disposed against longitudinally moving concentric transverse rib forming molds and formed against the molds with suction. The innermost tubular stream is then adhered to the inside surfaces of the formed corrugations of the outermost tubular stream. The extrusion rates of the streams are adjusted to maintain a constant thickness in the formed and adhered tubes. A third tubular stream having a smooth wall configuration may be extruded and adhered to the outer surface of the corrugated tube if desired.

---

Smooth plastic pipes that are extruded from annular dies have the disadvantage that they have poor diametral compressive strength, that is, they are easy to collapse by squeezing them. In order to give them the necessary strength, they must have considerable wall thickness. Smooth plastic pipe, even of the thin variety having less than satisfactory flexibility, has even less flexibility where the pipe wall thickness is increased in order to impart greater diametral strength thereto.

Attempts have been made to impart greater diametral strength to plastic pipe without overly decreasing the flexibility thereof by providing solid annular or helical ribs therearound. While improvements in diametral strength without extreme reduction in flexibility has been accomplished by this technique, it would still be desirable to further improve this situation.

Corrugated pipes can be made by a process in which a tube extruded from an annular die is carried in the still plastic state between continually recirculating bipartite sets of hollow molds which are provided with corrugations, and the tube is drawn by an external vacuum or forced by internal pressure into the corrugations in the hollow molds. These tubes, however, again have the disadvantage that their inside surface is not smooth, but is likewise corrugated, so that such pipes cannot be used for purposes in which a smooth inside surface is required, e.g., for sewerage service or air conditioning or ventilating ducts and pipe through which liquid is to be pumped. Such pipes are not suitable as pressure piping, either, since a change in pressure inside of the pipe produces a change in its length. Furthermore, pipes made of plastic are known, especially drain pipes, which have annular or helical reinforcing ribs on their outside surface and a smooth inside surface. Such pipes have a higher diametral compressive strength than smooth extruded plastic pipe, but they have very poor flexibility, since the already poor flexibility of the plain pipe is even further impaired by the solid ribs created on it.

It is also in the prior art to extrude two plastic pipes concentrically to one another, using a dual annular extruding die, longitudinal ribs being able to be formed on the inside pipe to space it off from the outside pipe. These pipes, however, are still less flexible than the single, plain plastic pipes.

It is therefore an object of this invention to provide a novel method of manufacturing a plastic pipe having high diametral strength as compared with pipe of the prior art.

It is another object of this invention to provide a novel method of manufacturing such improved diametral strength plastic pipe with flexibility which is not significantly reduced as compared with prior art pipe.

Other and additional objects of this invention will become apparent from a consideration of this entire specification including the drawing and claims hereof.

In accord with and fulfilling these objects, one aspect of this invention resides in a plastic pipe having a smooth inside wall and a ribbed wall external thereof wherein the ribs are hollow and thus form corrugations. It is within the scope of this aspect of this invention to provide a pipe having a smooth inner wall and a corrugated outer wall. It is further within the scope of this aspect of this invention to provide a pipe having smooth inner and outer walls and corrugation therebetweeen.

Another aspect of this invention resides in the process of producing "reinforced" plastic pipe as generally described above. According to this aspect of this invention, plastic pipe is formed by multiwall extrusion techniques. Where a pipe is desired having a smooth inner wall and a corrugated outer wall, such is produced by extrusion through two concentric dies such that the outer wall is formed first and, while still in the plastic state, is corrugated through the use of internal fluid pressure, external vacuum or a combination thereof forcing the formed tubular wall into annular or helical molds in a serpentine manner. The smooth inner wall is extruded as a tube within this serpentine walled outer tube with an outside diameter substantially equal to the smallest inside diameter of the serpentine folds. It is preferred to so extrude the smooth inner tube over an extended mandrel which causes such inner tube to bear against and adhere to the smallest inside diameter portions of the serpentine folded outer tube and thus close off each serpentine fold and so form hollow ribs or corrugations.

Where a pipe is desired having a smooth outer wall, it is within the scope of this invention to provide a third concentric extruder such as to form an outer smooth tube having an inside diameter substantially equal to the largest outside diameter of the referred to serpentine folds and bearing thereagainst in order to adhere thereto. It is of course within the spirit and scope of this invention to provide additional corrugated walls and/or additional smooth walls in alternating relation as desired for pipe of any particular total wall thickness desired, rigidity and diametral strength.

As used herein the term "concentric extrusion" is intended to mean that each successive wall is extruded concentric to its adjacent wall. Such term is in no way intended to be limited to an absolutely simultaneous, concentric wall formation. In fact, it is within the scope of this invention to extrude a next adjacent outer tube of either smooth or serpentine configuration concentric to an already preformed next adjacent inner tube or tube composite. Further, in the case where plastic pipe of finite length is produced according to this invention, it may even be practical, under some circumstances, to extrude a next adjacent inner tube of either smooth or serpentine configuration concentric to and within an already preformed next adjacent outer tube.

It will be appreciated that while for some purposes press-fit adjacent tubes will suffice, for most purposes it will be desirable that adjacent tubular portions of the pipe of this invention be joined together in a more adherent manner and with less stress upon the members (which stress might result in cold flow of one or both members). Thus it is preferred that at least one of two adjacent tube members be in an adherent state upon production of this pipe. This adherent state may be caused by a tube being still at least partially thermoplastic upon contact with its next adjacent member, or such may be provided through the use of suitable adhesives. The thermo plastic adherable state is to be preferred since by this means no external material is or need be added to the system.

Where two or more walls of the multi-wall pipe of this invention are to be produced substantially simultaneously, a common feed of plastic material to a single extruder with two dies can be used. Alternately, separate feeds can be provided to each die of a single extruder. Thus it will be apparent that the individual wall members of the pipe of this invention can consist of the same or different plastic materials.

Understanding of this invention will be facilitated by reference to the accompanying drawing in which:

FIG. 3 shows a pipe manufactured by the process of the invention, partially in elevation, partially with the outer covering cut away, and partially in section.

FIG. 4 shows in longitudinal and cross section, respectively, a drain pipe manufactured by the method of the invention and having orifices for the admission of water.

Figure 1:
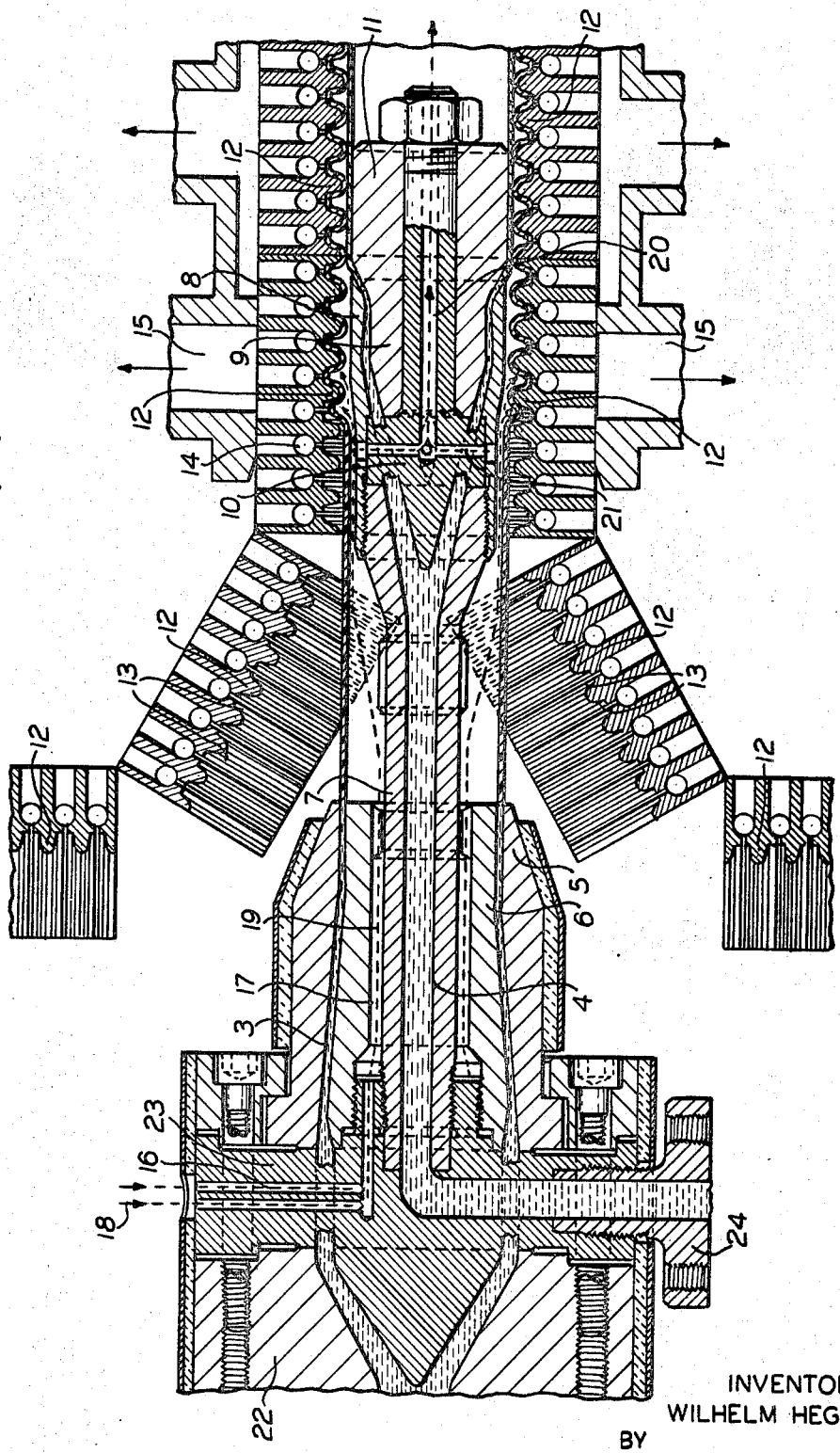
FIG. 1 shows an apparatus for the practice of the method of the invention in a longitudinal section in which both pipes are manufactured from the same material by the use of two different extruding machines.

According to the invention, two concentric pipes can be extruded in a single operation, the outer pipe being guided in a prior art manner, after emerging from the annular extruding die, between continually recirculating bipartite sets of hollow molds and being sucked by a vacuum into the corrugations of the molds, while the inside pipe is extruded from a die located within the train of assembled hollow molds, the latter die being so arranged that the smooth inside pipe applies itself to the completely formed outer corrugated pipe. In this manner a pipe having a smooth inside wall is produced, in which the external mechanical stresses are taken up by the corrugated outer wall, so that the pipe has a high compressive diametral strength, while the inside pipe can be relatively thin-walled so that such pipes are still quite flexible.

The extruding of the pipes can be accomplished in a known manner by using a single extruding machine which supplies the molding compound for both pipes, that is, which feeds both of the annular extruding dies. The outer wall and inner wall in this case consist of the same material. However, each of the two annular dies can be fed from its own separate extruding machine. This makes it possible for the outer wall and inner wall to be made of different materials, e.g., the outer wall of a relatively hard material which provides the necessary diametral compressive strength, while the inner wall can consist of a soft and elastic material, thereby assuring a higher pipe flexibility.

In the practice of the method of the invention, the outer pipe can emerge from the annular die at a speed which is greater than the speed with which the hollow molds are carried on their path, while the inner pipe can emerge from the annular die at a speed which is equal to or lower than the speed at which the hollow molds are carried on their path. In this manner the assurance can be had that the inside pipe applies itself to the outside pipe at all points at which the outside pipe has corrugations; furthermore, both the material of the outside wall and the material of the inside wall are to be still sufficiently plastic at the point at which this contact takes place that a permanent bond is created between the two pipes. On the other hand, however, the inside pipe can be kept under a certain tension so as not to sink into the corrugations of the outside pipe before hardening, which would produce a corrugation on the inside pipe, too.

If the pipes are to be used as drain pipes or irrigating pipes or for other such purposes, in which inlet or outlet orifices must be provided in the wall, longitudinal channels can be produced in the inside wall which cross the transverse corrugations in the outside wall, while the hollow molds have at their projecting portions matching recesses, so that protuberances are produced in the valleys between corrugations and the longitudinal channels running through these protuberances. These protuberances can then be cut open to produce the orifices.

In this case, it is best to make the external transverse corrugations helical in form, so that the tool for cutting open the protuberances can be guided in the helix. At the same time the wall of the pipe can also be designed in the form of a double or multiple helix and, depending on the number of orifices necessary, orifices can be located in only one helix of a double-helical pipe, for example.

If a pipe manufactured by the process of the invention must also be smooth on the outside, a third, smooth external pipe can be extruded over the pipe in a further manufacturing operation. This outside pipe can again be made of a different material than the inner pipe, a softer material, for instance, so as to impair the flexibility of the entire pipe as little as possible.

A further aspect of this invention is an apparatus for the practice of the method of the invention. An extruding apparatus must be used which has two annular dies, the die that produces the inner pipe being disposed expediently in a prolongation of the mandrel of the annular die that produces the outside pipe, this prolongation being made so long that the annular die for producing the inside pipe is located within the train of closed hollow molds and the annular die for producing the outside pipe is located in the first part of or outside of the train of closed hollow molds. In order that the inside pipe may be applied firmly to the outside pipe and be welded to the latter, a mandrel prolongation can be disposed on the annular die that produces the inside pipe, the diameter of the said mandrel being at least approximately the same as the inside diameter of the outside, corrugated pipe, so that this mandrel prolongation will urge the inside pipe against the outside pipe which is inside of the hollow molds and supported by them. If a pipe is to be made which can be used as a drain pipe with orifices for letting water in or out, the longitudinal channels can be produced in the inside wall of the inside pipe by corresponding projections on this mandrel prolongation, which force the inside pipe against the outside pipe also at the points at which the projecting parts of the hollow molds have recesses.

If the metal tube bearing the annular die for the production of the outside pipe extends into the train of closed hollow molds, the distance between the annular dies and the extruding machine becomes relatively great. As a result of the sucking out of the air from the grooves in the hollow molds, air is constantly flowing in from the exterior along this tube and cools it. In order to prevent the plastic in this tube from cooling below the softening temperature, the tube should be equipped with a heating band or a thermally insulating covering, especially one made of asbestos.

In the apparatus of FIG. 1 the plastic coming from the extremity 22 of a first extruding machine is fed through a mounting ring 23 to a die 5 while the plastic coming from a second extruding machine is fed through a fitting 24 and an additional hole in the mounting ring 23 to a die 8. The plastic coming from this second extruding machine constitutes the interior stream of plastic 4. The outside stream emerges from an annular die 5 as a smooth tube, a mandrel 6 of the said die being provided with a prolongation 7 bears a second die 8, whose mandrel 9 is held by a second mounting ring 10. It is desirable for the die 8 and the mandrel 9 to be so shaped that the inner pipe, as represented, is extruded at a sharp angle against the outside pipe which in the meantime has been corrugated. There is provided on the mandrel 9 a mandrel prolongation 11 whose outside diameter is the same as the desired inside diameter of pipe to be made, i.e., the diameter is smaller than the minimum inside diameter of the hollow molds by the thickness of the tube being manufactured.

The smooth pipe emerging from the die 5 passes between hollow bipartite molds 12 which are circulating in the manner of crawler treads. Air is pumped out of the grooves 13 in the hollow molds, by means of a vacuum line 15, as soon as the molds are fully closed. As is shown in the drawing, the vacuum draws the previously smooth outer tube into the grooves in the molds thereby drawing the tube against the molds. Since in order for this to be possible normal air pressure must prevail inside of the outside pipe, holes 16 are provided in the mounting ring 2 and holes 17 are provided in mandrel 6, through which, as indicated by arrows 18 and a broken line 19, the air is able to enter. Through additional holes 20, in mandrel 9, and 21 in the mounting ring, air can also flow from the inside pipe into the interior of the outside pipe. The guidance of hollow bipartite molds 12 is not shown in detail, since bipartite molds of this type which are circulated in the manner of crawler treads are known to the prior art. After the outside pipe and inside pipe have passed the mandrel prolongation 11 and have been joined together, the hollow molds are cooled below the hardening temperature of the plastic, and the finished pipe continuously emerges from the opening molds.

Figure 2:
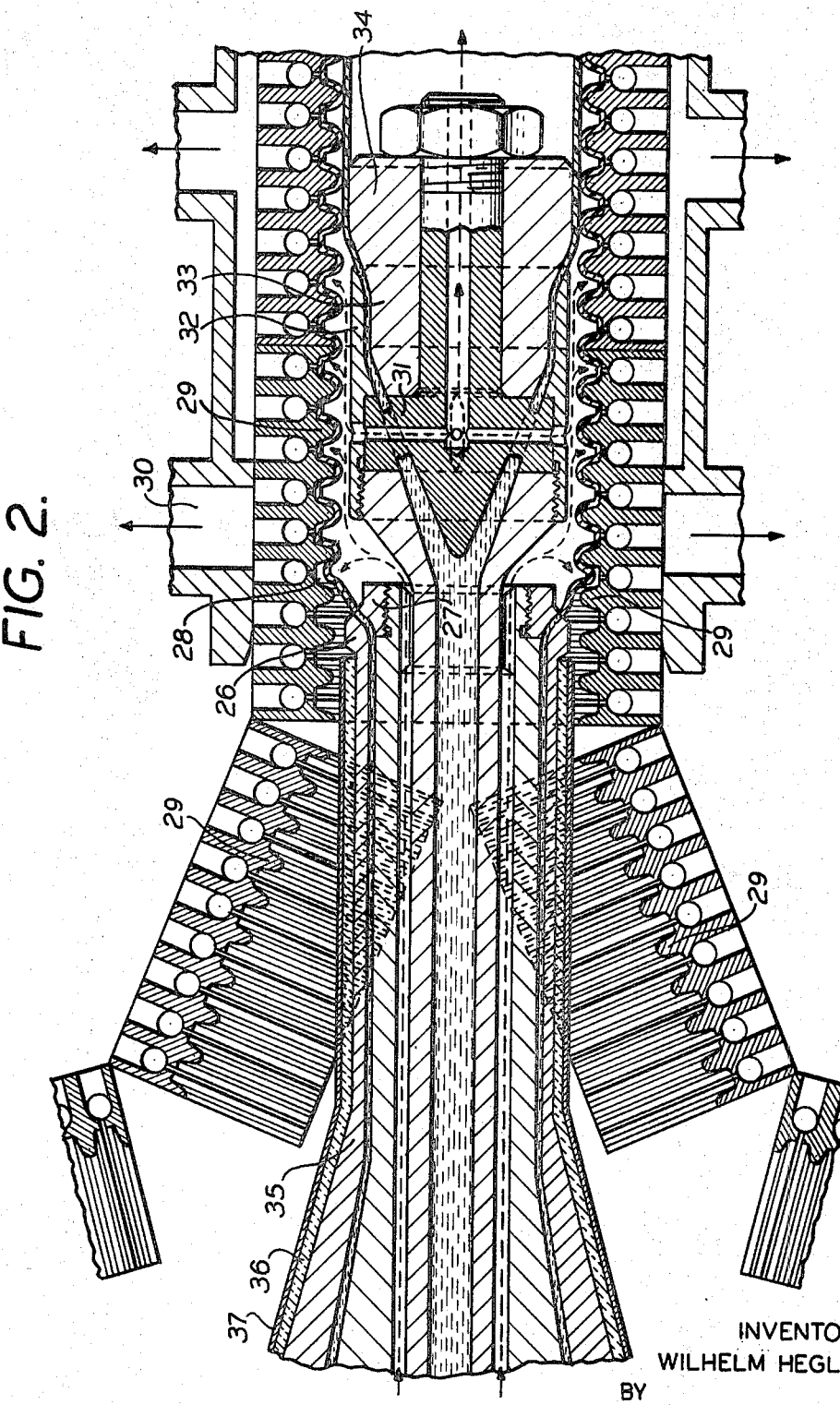
FIG. 2 shows another apparatus for the manufacture of larger sizes of pipe.

In the apparatus of FIG. 2, the extruding machines and the feed lines are not shown. In this apparatus the plastic can be fed from two extruding machines, as in the case of the apparatus of FIG. 1. This apparatus differs from the apparatus of FIG. 1 in that the die 26 for the production of the outside pipe is located not outside but inside the train of closed hollow molds. An arrangement of this kind is especially desirable when the manufacture of pipes of relatively large diameter is involved, whereas the apparatus of FIG. 1 is more suitable for pipes having smaller diameters. The die 26 and the corresponding mandrel 27 are in this case so designed that the emerging plastic is extruded at an acute angle into grooves 28 in molds 29, thus aiding the formation of transverse corrugations. The aspiration of the air from grooves 28 by means of a vacuum line 30 in this case can best begin at the point at which the plastic is injected into the grooves in order to form the outer pipe. As in the apparatus of FIG. 1, here again the mandrel 33 and the mandrel prolongation 34, by which the inside pipe is forced against the inner folds of the outside tube and is thereby welded to same, are disposed on the mounting ring 31 of a die 32.

As already mentioned, the result of aspiration of air from the grooves 28 is that air flows in from the left through the closing molds 29 along pipe 35. This could result in an excessive cooling off of pipe 35, which could result in trouble and in the danger of explosion. For this reason, pipe 35 is surrounded by a heating band or by a thermally insulating covering 36. This thermal insulation is held in place by a clamping means 37.

The pipe manufactured with one of the apparatus of FIGS. 1 or 2 can, if desired, have a third smooth outer tube extruded around it afterwards. Such a pipe is shown in FIG. 3 partially in section. This pipe consists of the smooth inside pipe 40, the transversely ribbed outer pipe 41, and the smooth outer pipe 42 drawn over the latter. Tubes 40 and 42 can consist of a relatively soft or elastic plastic, and can have a relatively thin wall, because neither of these tubes have to withstand mechanical stresses, though they must permit themselves to be elongated or compressed when the entire pipe is bent. Tube 41, however, is relatively thick-walled or consists of a relatively hard plastic, so that it has the required diametral compressive strength, and this tube is designed to take the mechanical stresses. FIG. 3 shows, in harmony with FIG. 2, that in a pipe manufactured by the method of the invention the helical ribs do not consist of solid material but are hollow.

FIG. 4 shows in longitudinal and cross section a pipe manufactured by the method of the invention and having orifices for the admission or exhaustion of water. In the manufacture of this pipe, the bipartite hollow molds have recesses on their inwardly projecting portions, so that the protuberances 45 are created in the exterior valleys between the corrugations. At the corresponding points, the mandrel prolongation 7 in FIG. 2, and prolongation 34 in FIG. 2, have projections which force the wall of the inside and outside pipe outwards, so that the longitudinal grooves 46 develop on the inside. A cutting tool is then guided about the finished pipe leaving the train of hollow molds and cuts off the protuberances 45, i.e., removes the portion that is not shown crosshatched in FIG. 4, so that the orifices 47 are formed at the points at which the outer transverse grooves 48 intersect the inner longitudinal grooves 46. FIG. 4 it is assumed that the outer transverse grooves form a double helix, only the protuberances in every other groove being cut off. If a larger number of water admission orifices is desired, or a larger total orifice cross section, the protuberances in the transverse grooves between them can also be cut off, in which case cutting tools are guided around the pipe in both helixes.

In accordance with the practice of this invention, the pipe can consist of substantially any plastic material which is suitable for extrusion, particularly extrusion to produce pipe. Exemplary of such materials are vinyl chloride homo- and copolymers, acrylonitrile homo- and copolymers, olefin polymers, vinyl ester and ether polymers, styrene polymers, polycarbonates, polyepoxides, polyurethanes, polyphenylene oxides, condensation polymers of the amide or ester type, etc.

What is claimed is:

1. Process of producing plastic pipe having a smooth inner wall and substantially hollow transverse ribs therearound, which inner wall is bonded to the smallest inside diameter portions of said transverse ribs, which process comprises substantially simultaneously extruding at least two separate, substantially concentric, tubular streams of said plastic from a corresponding number of extruders; maintaining the innermost of said tubular streams in a substantially constant inside and outside diameter smooth wall condition; disposing the next to the innermost of said tubular streams against longitudinally moving outwardly concentric transverse rib form mold means; applying a vacuum through said mold means whereby inducing said next innermost tubular stream to conform to said mold means while maintaining a substantially uniform wall thickness therein, where the innermost diameter of said rib-molded tube substantially corresponds to the outermost diameter of said innermost smooth walled tube; and adhering said innermost and outermost diameters together whereby forming a smooth innerwalled tube having transverse hollow ribs disposed therearound, wherein the innermost and next innermost tubular streams are extruded at different flow rates sufficient to form said smooth innermost tube and said next innermost rib molded tube at substantially the same longitudinal linear speed.

2. Process as claimed in claim 1 wherein said next innermost stream is extruded as a substnatially smooth first wall tube member, is passed through longitudinally moving bipartite hollow serpentine mold means while still in the plastic state, is formed into said ribbed tube by said molds during movement thereof, and is adhered to said smooth inner tube wall member after molding thereof into said transverse tube configuration.

3. Process as claimed in claim 2 including extruding said next innermost stream at a linear flow rate sufficiently higher than the linear rate of any point on said bipartite mold means to maintain the wall thickness of said next innermost tube substantially the same prior to, during and after molding thereof to the shape of said bipartite mold means; and extruding said innermost stream at such a linear flow rate that the wall thickness thereof is maintained substantially constant before, during and after adherence of said innermost tube to said next innermost tube.

4. Process as claimed in claim 2 wherein said transverse ribbed tube wall member emerges from said molds at a speed at least as high as the speed of extrusion of said inner smooth tube wall member.

5. Process as claimed in claim 2, wherein said substantially smooth first tube member is extruded at a speed greater than the speed at which said ribbed tube wall member emerges from said bipartite hollow serpentine molds.

6. Process as claimed in claim 1 carried out continuously.

7. Process as claimed in claim 1 including substantially simultaneously forming a second smooth tube wall member, having an inside diameter substantially equal to the largest outside diameter of said next innermost tube wall member, concentric with and outside said next innermost tube wall member and in intimate contact therewith along at least some of the largest outside diameter surfaces thereof.

8. Process as claimed in claim 1 including forming protuberances on the outer side of the smaller diameter portions of said ribbed tube wall member; forming longitudinal grooves on said inner smooth tube wall member in registry with said protuberances; and then cutting these protuberances so as to form apertures in said pipe.

References Cited

UNITED STATES PATENTS

| | | | |
|---|---|---|---|
| 2,286,117 | 6/1942 | Sidnell | 264—154 |
| 3,084,396 | 4/1963 | Abt | 264—154 X |
| 3,280,430 | 10/1966 | Antrobus | 18—14 |
| 3,310,620 | 3/1967 | Martelli et al. | 264—99 X |
| 3,372,920 | 3/1968 | Corbett et al. | 264—173 X |
| 3,388,425 | 6/1968 | Deter | 264—173 X |

FOREIGN PATENTS

| | | |
|---|---|---|
| 716,183 | 9/1954 | Great Britain. |

ROBERT F. WHITE, Primary Examiner

J. H. SILBAUGH, Assistant Examiner

U.S. Cl. X.R.

18—14; 264—99, 145, 154, 173

UNITED STATES PATENT OFFICE
CERTIFICATE OF CORRECTION

Patent No. 3,538,209　　　　　　　　Dated November 3, 1970

Inventor(s) Wilhelm Hegler

It is certified that error appears in the above-identified patent and that said Letters Patent are hereby corrected as shown below:

Column 3, line 33, "4 shows" should read -- 4 and 5 show Column 6, line 8, "Fig. 4" should read -- Figs. 4 and 5 --; line 15, "Fig. 2" should read -- Fig. 1 --; line 22, "Fig. 4" should read -- Fig. 5 --.

Signed and sealed this 25th day of May 1971.

(SEAL)
Attest:

EDWARD M. FLETCHER, JR.　　　　　　WILLIAM E. SCHUYLER, JI
Attesting Officer　　　　　　　　　Commissioner of Patent: